(12) United States Patent
Bai et al.

(10) Patent No.: US 10,829,679 B1
(45) Date of Patent: Nov. 10, 2020

(54) MICRO-NANOMETER PLUGGING ANTI-COLLAPSE DRILLING FLUID AND PREPARATION METHOD AND USE THEREOF

(71) Applicant: Southwest Petroleum University, Chengdu (CN)

(72) Inventors: Yang Bai, Chengdu (CN); Pingya Luo, Chengdu (CN); Cheng Li, Chengdu (CN); Yan Cheng, Chengdu (CN); Guojun Li, Chengdu (CN); Hao Zhang, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/743,811

(22) Filed: Jan. 15, 2020

(30) Foreign Application Priority Data

Dec. 2, 2019 (CN) .......................... 2019 1 1215700

(51) Int. Cl.
| | | |
|---|---|---|
| *C09K 8/24* | (2006.01) | |
| *C09K 8/16* | (2006.01) | |
| *C09K 8/20* | (2006.01) | |
| *C09K 8/14* | (2006.01) | |

(52) U.S. Cl.
CPC ................ *C09K 8/16* (2013.01); *C09K 8/145* (2013.01); *C09K 8/206* (2013.01); *C09K 8/24* (2013.01); *C09K 2208/10* (2013.01)

(58) Field of Classification Search
CPC . C09K 8/16; C09K 8/206; C09K 8/24; C09K 8/145; C09K 2208/10; C09K 8/032; C09K 8/035; C09K 2208/34; C09K 8/08; C09K 8/36; C09K 8/502; C09K 2208/00; C09K 2208/28; C09K 8/34; C09K 8/12; C09K 8/32; C09K 8/516; C09K 2208/32; C09K 8/42; C09K 8/62; C09K 2208/18; C09K 8/22; C09K 8/46; C09K 8/487; C09K 8/52; C09K 2208/12; C09K 2208/26; C09K 3/18; C09K 3/185; C09K 5/10; C09K 5/20; C09K 8/467; C09K 8/528; C09K 8/58; C09K 8/588; C09K 8/602; C09K 8/64; C09K 8/68; C09K 2208/08; C09K 8/02; C09K 8/04; C09K 8/10; C09K 8/424; C09K 8/426; C09K 8/473; C09K 8/48; C09K 8/5045; C09K 8/524; C09K 8/5758; C09K 8/74; C09K 8/80; C09K 8/882; C09K 2208/20; C09K 2208/22; C09K 2208/24; C09K 2208/30; C09K 5/14; C09K 8/03; C09K 8/06; C09K 8/14; C09K 8/20; C09K 8/265; C09K 8/28; C09K 8/50; C09K 8/506; C09K 8/508; C09K 8/5083; C09K 8/512; C09K 8/575; C09K 8/5751; C09K 8/605; C09K 8/76; C09K 8/82; C09K 8/86; C09K 8/92; E21B 21/00; E21B 21/003; E21B 43/16; E21B 43/26; E21B 7/00; E21B 33/13; E21B 33/138; E21B 21/062; E21B 47/005; E21B 21/06; E21B 33/14; E21B 21/065; E21B 21/068; E21B 33/03; E21B 33/134; E21B 37/06; E21B 41/02; E21B 43/04; E21B 43/10; E21B 43/267; E21B 47/01; E21B 47/113; E21B 21/01; E21B 36/00; E21B 36/008; E21B 37/00; E21B 41/005; E21B 43/2405; E21B 43/2406; E21B 47/135

See application file for complete search history.

(56) References Cited

U.S. PATENT DOCUMENTS

| | | | |
|---|---|---|---|
| 10,233,375 B1 * | 3/2019 | Luo ........................ | C09K 8/24 |
| 2012/0245058 A1 * | 9/2012 | Monteiro ............... | C09K 8/032 |
| | | | 507/110 |
| 2019/0023964 A1 * | 1/2019 | Davis ...................... | C09K 8/12 |

FOREIGN PATENT DOCUMENTS

| | | | |
|---|---|---|---|
| CN | 108165244 | * | 6/2018 |
| CN | 110452669 | * | 11/2019 |

* cited by examiner

*Primary Examiner* — Kumar R Bhushan
(74) *Attorney, Agent, or Firm* — Volpe Koenig

(57) ABSTRACT

A micro-nanometer plugging anti-collapse drilling fluid and fracturing method and use thereof.

17 Claims, No Drawings

MICRO-NANOMETER PLUGGING ANTI-COLLAPSE DRILLING FLUID AND PREPARATION METHOD AND USE THEREOF

PRIORITY CLAIM & CROSS REFERENCE

The application claims priority to Chinese Application No. 201911215700.1, filed on Dec. 2, 2019, entitled "micro-nanometer plugging anti-collapse drilling fluid and preparation method and use thereof", which is herein specifically and entirely incorporated by reference.

FIELD

The present disclosure relates to the technical field of drilling fluid, particularly relates to a micro-nanometer plugging anti-collapse drilling fluid and preparation method and use thereof.

BACKGROUND

The unbalanced crustal stress of the stratum is broken and the stress release type cracks are frequently generated during the drilling process of carbonate rock broken strata in the fractured zone of the deep well and the ultra-deep well. The drilling fluid filtrate invades the stratum apertures, it will destroy the effective cementation among the stratum rock clay minerals, such that the micro-nanometer apertures are further expanded and connected, and the borehole wall collapse pressure is reduced. The rotary drilling rig will inevitably impose a mechanical collision effect on the well wall during the process of drilling or lifting and lowering the drilling rig, so that the well wall collapses and the block falls off, the serious circumstance may be jamming of the drilling rig, thus the drilling efficiency is affected and the drilling cost is significantly increased.

An use of the mixed oil drilling fluid or the oil-based drilling fluid can avoid clay hydration of stratum minerals to a certain extent, the drilling fluid has excellent adaptability to underground stratum rocks, and can keep stability of the well wall to the maximum extent when the drilling fluid is applied in the drilling process of the carbonate rock broken strata in the fractured zone of the deep well and the ultra-deep well. However, the cost of the oil-based drilling fluid is high, and the waste oil-based drilling fluid is classified as national hazardous waste and its treatment is extremely difficult because the waste oil-based drilling fluid contains pollutants such as oils, heavy metals and organic matters, thus the large-scale efficient and safe application of the oil-based drilling fluid is seriously restrained.

The existing drilling fluid plugging agent has large particle size, its matching with bentonite, barite and other drilling fluid treating agents can hardly form the efficient plugging anti-collapse drilling fluid with uniformly distributed particle size, it is difficult to form mud cakes with permeability approaching zero, let alone improving the pressure bearing capacity of the stratum and avoiding collapse and falling blocks during the drilling process.

In addition, although the particle size of the nanometer material is extremely small, theoretically the nanometer material can enter a nanometer aperture and bridge the holes and plug at the port, the nanometer material has poor dispersion stability and is prone to agglomerate and form blocks, thereby influencing the service performance of the nanometer material.

Up to now, it has important strategic and practical significance to discover a solution concerning how to avoid agglomeration of the nanometer materials and develop the micro-nanometer plugging anti-collapse drilling fluid.

SUMMARY

To overcome the defects of high cost and environmental pollution of using an oil-based drilling fluid, and the defect of unsatisfactory plugging and anti-collapse effects of using an existing water-based drilling fluid when drilling the carbonate rock broken strata in the fractured zone of the deep well and the ultra-deep well, and the defects of poor dispersion stability and high possibility of agglomeration in the drilling fluid of using an existing nanometer plugging agent in a high-temperature and high-pressure environment, the present disclosure provides a micro-nanometer plugging anti-collapse drilling fluid and preparation method and use thereof, the drilling fluid has desirable plugging and anti-collapse effects during a drilling process of the carbonate rock broken strata in the fractured zone of the deep well and the ultra-deep well.

In a first aspect, the present disclosure provides a micro-nanometer plugging anti-collapse drilling fluid, which comprises water, bentonite, a filtrate reducer, an anti-collapse agent, a nanometer plugging agent and a weighting agent;

wherein the anti-collapse agent is one or more selected from the group consisting of modified asphalt, calcium carbonate powder and nanometer paraffin emulsion; the calcium carbonate powder comprises 400 mesh calcium carbonate powder and 1,250 mesh calcium carbonate powder; the nanometer paraffin emulsion has a median particle size D50 of 6.5 μm;

wherein the nanometer plugging agent is surface modified nanometer carbon powder, and the nanometer plugging agent has an average particle size of 30-85 nm.

In a second aspect, the present disclosure provides a method for preparing a drilling fluid, including:

(a) subjecting bentonite to a pre-hydration treatment;

(b) mixing the hydrated bentonite slurry obtained in the step (a) with a filtrate reducer, an anti-collapse agent, a nanometer plugging agent and a weighting agent sequentially under the stirring condition.

In a third aspect, the present disclosure provides a method of the aforementioned drilling fluid being used in a drilling process of the carbonate rock broken strata in the fractured zone of the deep well and the ultra-deep well.

Due to the implementation of the aforementioned technical solution, the drilling fluid provided by the present disclosure has the following advantages:

(1) By controlling the proportion of the treatment agent components of the drilling fluid and selecting the optimal addition amount, the particle size distribution of the solid-phase particles in the drilling fluid may form a trapezoid-like distribution within a range of 0.2 μm to 200 μm; under the action of the high-temperature and high-pressure environment filtrate loss of the deep well and the ultra-deep well, a thin and tough artificial mud cake protective layer with extremely low permeability can be quickly formed, such that the cementation strength of weak cementation stratification of a broken layer is quickly enhanced, and the self-developed micro-nanometer apertures are plugged; the strength of a broken layer well wall stratum is improved, and the influence of hydraulic wedge and stripping effect caused by the invasion of a large amount of drilling fluid filtrate during drilling under over-balanced pressure is effectively prevented; thereby effectively avoiding the collision impact of the drilling tool on the well wall when the liquid column stress is unevenly distributed due to the development of high permeability and strong heterogeneity of the apertures in the broken stratum.

(2) The nanometer plugging agent (surface modified nanometer carbon powder) has an average particle size of 30-85 nm, the nanometer plugging agent contains surface hydrophilic solid-phase particles, it has desirable dispersion stability in an aqueous solution; it belongs to the rigid plugging agents with high strength and pressure-bearing capacity, and it is free from biotoxicity, thus it is an environment-friendly drilling fluid treating agent.

(3) The ratio of dynamic shear force or the ratio of yield value to plastic viscosity of the drilling fluid at the high temperature of 90° C. is within a range of 0.35-0.50, the flow nucleus size is increased, the peak type laminar flow is converted into the flat laminar flow, such that the effective rock-carrying under the condition of low ring back velocity can be realized; the erosion of the drilling fluid to the well wall when the drilling fluid is in a turbulent flow state may be effectively avoided, and the cleanness of the wellbore and the stability of the well wall can be continuously kept.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a micro-nanometer plugging anti-collapse drilling fluid, which comprises water, bentonite, a filtrate reducer, an anti-collapse agent, a nanometer plugging agent and a weighting agent;

wherein the anti-collapse agent is one or more selected from the group consisting of modified asphalt, calcium carbonate powder and nanometer paraffin emulsion; the calcium carbonate powder comprises 400 mesh calcium carbonate powder and 1,250 mesh calcium carbonate powder; the nanometer paraffin emulsion has a median particle size D50 of 6.5 µm;

wherein the nanometer plugging agent is surface modified nanometer carbon powder, and the nanometer plugging agent has an average particle size of 30-85 nm.

According to the present disclosure, the average particle size of the nanometer plugging agent is preferably within a range of 35.3-75.2 nm. In addition, it shall be noted that the average particle size is a range, and mainly means that the median particle size D50 of the surface modified nanometer carbon powders prepared under different experimental conditions are different, thus the average particle size is a range value.

According to the present disclosure, the bentonite is contained in an amount of 1-10 parts by weight, the filtrate reducer is contained in an amount of 1-20 parts by weight, the anti-collapse agent is contained in an amount of 1-40 parts by weight, the nanometer plugging agent is contained in an amount of 1-10 parts by weight, and the weighting agent is contained in an amount of 5-80 parts by weight, based on 100 parts by weight of water.

Preferably, the content of bentonite is 2-7 parts by weight, the content of filtrate reducer is 5-13 parts by weight, the content of anti-collapse agent is 8-28 parts by weight, the content of nanometer plugging agent is 1.5-4.5 parts by weight, and the content of weighting agent is 5-60 parts by weight, based on 100 parts by weight of water.

More preferably, the content of bentonite is 3-5 parts by weight, the content of filtrate reducer is 7-11 parts by weight, the content of anti-collapse agent is 15-20 parts by weight, the content of nanometer plugging agent is 2-3 parts by weight, and the content of weighting agent is 10-32 parts by weight.

In the present disclosure, the components and the component contents of the treating agents (i.e., water, bentonite, anti-collapse agent, nanometer plugging agent and weighting agent) are strictly controlled, such that the treating agents are reasonably matched through rigid particles and elastic particles and reasonably graded among different particle sizes, the prepared micro-nanometer plugging anti-collapse drilling fluid can compactly plug the development of apertures in the carbonate rock broken strata in the fractured zone of the deep well and the ultra-deep well, and the complex accidents such as large-scale block falling, collapse, buried drilling of the well wall during drilling are suppressed, and the use effects are desirable.

According to the present disclosure, the weighting agent is barite, wherein the main component of the barite is barium sulfate. In the present disclosure, the barite may be commercially available, it is white powder having the density of 4.5 g/cm³, the content of barium sulfate is ≥98%, the Mohs hardness is 3.5, and the particle size is distributed within a range of 45-74 µm.

According to the present disclosure, the anti-collapse agent is one or more of the group consisting of modified asphalt, calcium carbonate powder and nanometer paraffin emulsion.

In the present disclosure, the calcium carbonate powder is 400 mesh calcium carbonate powder and 1,250 mesh calcium carbonate powder, and preferably, the weight ratio of the contents of the 400 mesh calcium carbonate powder and the 1,250 mesh calcium carbonate powder is 1:(1-3), more preferably 1:1. Moreover, it should be noted in the present disclosure that the 400 mesh is corresponding to a particle size of 37.5 µm and the 1,250 mesh is corresponding to a particle size of 12.0 µm.

In the present disclosure, the modified asphalt is contained in an amount of 1-10 parts by weight, the 400 mesh calcium carbonate powder is contained in an amount of 1-10 parts by weight, the 1,250 mesh calcium carbonate powder is contained in an amount of 1-10 parts by weight, and the nanometer paraffin emulsion is contained in an amount of 1-10 parts by weight, based on 100 parts by weight of water; preferably, the modified asphalt is contained in an amount of 2-7 parts by weight, the 400 mesh calcium carbonate powder is contained in an amount of 2-7 parts by weight, the 1,250 mesh calcium carbonate powder is contained in an amount of 2-7 parts by weight, and the nanometer paraffin emulsion is contained in an amount of 2-7 parts by weight, based on 100 parts by weight of water; more preferably, the modified asphalt is contained in an amount of 2.5-3.5 parts by weight, the 400 mesh calcium carbonate powder is contained in an amount of 4.5-5.5 parts by weight, the 1,250 mesh calcium carbonate powder is contained in an amount of 4.5-5.5 parts by weight, and the nanometer paraffin emulsion is contained in an amount of 3.5-5.5 parts by weight, based on 100 parts by weight of water.

Wherein the modified asphalt may be commercially available, for example, the modified asphalt may be purchased from Tianjin Chengli Chemical Co., Ltd. with a model Number FT342, it is black solid asphalt powder with a softening point of 130° C., a ductility of 30 cm, a needle penetration of 1.0 mm, and a flash point of 300° C. The modified asphalt is a modified product of natural asphalt, it has desirable effects of plugging, filling micropores of mud cakes and reducing filtrate loss, it can become an oil film to be adsorbed on a well wall and a drilling tool at a temperature above the softening point, improve the lubricity of slurry, has the effects of plugging, reducing filtrate loss, lubricating and protecting the well wall, and exhibits excellent properties of temperature resistance and salt resistance.

Wherein the calcium carbonate powder is prepared by directly pulverizing natural calcite, limestone, chalk and shell with mechanical method.

The 400 mesh calcium carbonate powder is commercially available, it is white powder, the content of calcium carbonate is ≥98.5%, the mesh number is 400 mesh, and the specific gravity is 2.7. Wherein the 1,250 mesh calcium carbonate powder is commercially available, it is white powder, the content of calcium carbonate is ≥98.5 percent, the mesh number is 1,250 mesh, and the specific gravity is 2.7.

The nanometer paraffin emulsion is prepared by using paraffin and a composite surfactant as the main raw materials and adopting a micro-emulsification technology, the average particle size is within a range of 0.1-20 μm, more preferable, the median particle size D50 is 6.5 μm, the nanometer paraffin emulsion has excellent fluidity and can be easily dispersed in water, and the drilling fluid added with the nanometer paraffin emulsion can effectively prevent solid-phase particles and filtrate in drilling and well completion fluids from entering deep parts of stratums by forming a paraffin shielding belt with extremely low permeability at the position close to a well wall during the drilling process of an oil layer, so that the drilling fluid is prevented from permanently blocking an oil-gas flow channel, a desirable oil-gas layer protection effect is achieved, and meanwhile, as the temporary plugging agent is paraffin, the temporary plugging agent is easy to flow back and does not cause damage to the oil layer. In the present disclosure, the nanometer paraffin emulsion is commercially available, it is transparent or semitransparent emulsion which emits blue light, has a pH of 6-9, it has a storage stability period more than 6 months, and exhibits excellent dispersibility, it does not delaminate when diluting with water in any proportion, and it does not break emulsion.

In the present disclosure, it shall be noted that the median particle size (D50) refers to a particle diameter corresponding to a cumulative percentage of particle size distribution of a sample reaches 50%, it has a physical meaning that the particles having a particle diameter larger than the median diameter accounts for 50% by weight, and particles having a particle diameter smaller than the median diameter also accounts for 50% by weight, the term is also referred to as a mean particle size, a median particle diameter, or an average grain size. In general, the median particle size is a definite value instead of an interval range.

According to the present disclosure, the filtrate reducer is a lignite resin and/or a low-viscosity polyanionic cellulose; the lignite resin is contained in an amount of 1-10 parts by weight, and the low-viscosity polyanionic cellulose is contained in an amount of 1-10 parts by weight, based on 100 parts by weight of water; preferably, the lignite resin is contained in an amount of 2-7 parts by weight, and the low-viscosity polyanionic cellulose is contained in an amount of 2-7 parts by weight, based on 100 parts by weight of water; preferably, the lignite resin is contained in an amount of 3-5 parts by weight, and the low-viscosity polyanionic cellulose is contained in an amount of 4-6 parts by weight.

Wherein, the lignite resin is mainly a multi-component copolymerization type drilling fluid filtrate reducer obtained by copolymerizing the nitrohumic acid and the sulfomethyl phenolic resin. In the present disclosure, the lignite resin is black brown powder, the pH value is within a range of 9.0-10.2, the apparent viscosity of fresh water slurry is ≤15 mPa·s, the filtrate loss at room temperature and medium pressure is ≤10 ml, the filtrate loss at high temperature and high pressure is ≤30 ml, the apparent viscosity of sodium chloride polluted slurry is ≤40 mPa·s, the filtrate loss at room temperature and medium pressure is ≤15 ml, and the filtrate loss at high temperature and high pressure is ≤40 ml. In the present disclosure, the filtrate reducer can form thin and tough mud cakes on the well wall, it has desirable lubricating effect and maintain benign rheological property, can be used in deep wells with higher stratum temperature, and can resist the temperature up to 200° C. In the present disclosure, the lignite resin may be commercially available, for example, be purchased from Renqiu Tenghui chemical Co., Ltd. in Hebei Province of the People's Republic of China (PRC) under the trade name SPNH.

Wherein the low-viscosity polyanionic cellulose (PAC-LV for short) is a water-soluble cellulose ether derivative prepared by chemically modifying the natural cellulose. In the present disclosure, the low-viscosity polyanionic cellulose is commercially available, for example, be purchased from Wen'an County Zhongde Chemical Co., Ltd. in Hebei Province, it is in powder shape and has a density of 0.35 g/cm$^3$, a starch or starch derivative content is 0%, the loss on drying is ≤10%, an apparent viscosity is ≤40%, and an API filtrate loss is ≤16 ml.

According to the present disclosure, a method for preparing the nanometer plugging agent includes:

(1) subjecting the nanometer carbon powder and nitric acid to a heating reflux reaction, and then carrying out cooling, centrifugal separation, washing and filtering treatment to obtain a sample S1;

(2) mixing the sample S1 with concentrated nitric acid and concentrated sulfuric acid, implementing a first ultrasonic treatment, and subsequently performing centrifugal separation and washing treatment to obtain a sample S2;

(3) dissolving the sample S2 in a dispersing agent in the presence of a defoamer and implementing a second ultrasonic treatment, water washing, centrifugal separation and drying treatment to obtain a sample S3;

(4) grinding the sample S3 to obtain the nanometer plugging agent.

According to the present disclosure, the nanometer plugging agent is a surface hydrophilic material made of surface modified nanometer carbon powder, it contains black spherical powdery particles with an average particle size of 30-85 nm, preferably 35.3-75.2 nm; the nanometer plugging agent in the present disclosure belongs to a rigid blocking agent, can be stably dispersed in an aqueous solution, and has high pressure-bearing capacity, it is free from biotoxicity, thus it is an environment-friendly drilling fluid treating agent.

According to the present disclosure, in the step (1), the concentration of nitric acid is 2.4-2.8 mol/L, and the dosage of the nanometer carbon powder is preferably 0.5-2.5 g relative to 100 mL of nitric acid. The conditions of the heating reflux reaction comprise: the heating temperature is 40-60° C., and the reflux time is 20-28 hours. In addition, the rotation speed of the centrifugal separation is 4000-6000 r/min, and the number of centrifugal separation is 3-5 times.

According to the present disclosure, the average grain diameter of the nanometer carbon powder is 20-100 nm; the nanometer carbon powder in the present is commercially available, for example, be purchased from Ningbo Jinlei nanometer materials technology Co., Ltd, the nanometer carbon powder is black ultra-fine carbon powder, the particle morphology is spherical, the density is 2.3 g/cm$^3$, the volume density is 0.21 g/cm$^3$, the average particle diameter is 50 nm, the specific surface area is 68 m$^2$/g, and the purity is 99.99%.

According to the present disclosure, the volume ratio of sulfuric acid to concentrated nitric acid in the step (2) is (2.5-3.5): 1, the sample S1 used in an amount of 0.1-0.5 g, relative to the total volume 100 mL of concentrated nitric acid and concentrated sulfuric acid; the time period of the first ultrasonic treatment is within a range of 4-6 hours, and the power is 1,000-1,500 W; the rotational speed of the centrifugal separation is within a range of 4,000-6,000 r/min, and the number of centrifugal separation is 3-5 times.

According to the present disclosure, the defoamer in the step (3) is isoamyl alcohol, and the dispersing agent is an aqueous solution containing sodium dodecyl sulfate; preferably, the concentration of the dispersant is within a range of 0.01-0.05 wt %.

Preferably, the amount of isoamyl alcohol is 0.05-3 mL and the amount of sample S2 is 0.05-0.4 g relative to 100 mL of the dispersant.

Preferably, the time period of the second ultrasonic treatment is 1-3 hours, and the power is within a range of 1,500-2,000 W.

Preferably, the drying temperature is 50-65° C. and the drying time is 8-12 hours.

Preferably, the rotating speed of the centrifugal separation is within a range of 4,000-6,000 r/min, and the number of centrifugal separation is 3-5 times.

According to the present disclosure, the conditions of grinding treatment are that the grinding is carried out in a ceramic grinding bowl with the diameter of 80 mm under the condition of normal temperature and pressure.

In a second aspect, the present disclosure provides a method for preparing drilling fluid, including:

(a) subjecting the bentonite to a pre-hydration treatment;

(b) mixing the hydrated bentonite slurry obtained in the step (a) with a filtrate reducer, an anti-collapse agent, a nanometer plugging agent and a weighting agent sequentially under the stirring condition.

According to the present disclosure, in the step (a), the bentonite is calcium bentonite, and the bentonite is prehydrated by adding 5 parts by weight of bentonite into 100 parts by weight of water, stirring for 20 min at the temperature of 45-55° C., then adding 0.05-0.5 part by weight, preferably 0.15-0.25 part by weight of sodium carbonate, stirring for 30 min at the stirring speed of 450-550 r/min, sealing and standing for 24 hours, and converting the calcium bentonite into sodium bentonite through the ion exchange and precipitation, so as to effectively improve the slurry production rate, that is, the pre-hydration treatment is carried out by using the sodium carbonate.

According to the present disclosure, in step (b), the stirring conditions comprise: stirring at a stirring speed of 750-850 r/min, wherein the filtrate reducer, the anti-collapse agent, the nanometer plugging agent and the weighting agent are sequentially added and mixing for 10-20 min.

In a third aspect, the present disclosure provides a method of the aforementioned drilling fluid being used in the drilling process of the carbonate rock broken strata in the fractured zone of the deep well and the ultra-deep well.

In the present disclosure, the deep well and the ultra-deep well refer to a deep well and an ultra-deep well. Wherein, the deep well refers to a vertical well with the well depth of 4,500-6,000 meters; the ultra-deep well refers to a vertical well with the well depth of 6,000-9,000 meters; in addition, it should be particularly mentioned in the present that, the well having a depth of 6,000 m is denoted as the deep well.

In the present disclosure, the deep well and ultra-deep well have the following features: the open hole well section is long, and multiple sets of stratum pressure systems need to be drilled through; the stability condition of the well wall is complex; the well temperature gradient and the pressure gradient are high; the drillability of deep stratum rock is poor; the load of the drilling machine is large.

According to the technical solution, the nitric acid, concentrated nitric acid, concentrated sulfuric acid and sodium dodecyl sulfate are used for carrying out surface chemical modification of the nanometer carbon powder, such that the nanometer carbon powder is converted from a surface hydrophobic type to a surface hydrophilic type, thereby significantly improving the dispersion stability of the nanometer carbon powder in an aqueous solution while inhibiting the agglomeration among particles. On the basis, the surface modified nanometer carbon powder and the anti-collapse agent are used synergistically along with the bentonite and the weighting agent, such that the particle size of the drilling fluid is sufficiently and uniformly distributed in the micro-nanometer level. The rigid particles and the elastic particles are uniformly distributed and reasonably graded among different particle sizes, so as to fully realize the multi-element synergistic plugging. The compact, tough and extremely thin mud cakes with the permeability approaching zero are formed in the drilling process, drilling fluid filtrate is prevented from entering the borehole wall and aperture to generate stress release cracks, the borehole wall is prevented from collapsing and falling blocks to cause sticking of the drilling tool in the drilling process, thereby performing the plugging and anti-collapse efficiently.

The present disclosure will be described in detail below by means of the Examples, in the following Examples and Comparative Examples:

The electronic balance with an accuracy 0.0001 g is purchased from Shanghai balance instrumentation factory;

the bentonite is purchased from Xinjiang Nonmetallic Minerals Xiazijie Bentonite Co., Ltd. with a product name Xinjiang Xiazijie Bentonite;

the calcium carbonate powder is purchased from the Shanggao County Guangming Non-metallic Mineral Powder Processing Factory in Jiangxi Province, and the model numbers are 400 mesh and 1,250 mesh;

the nanometer paraffin emulsion is purchased from Fushun Wenai New Technology Co., Ltd. in Liaoning Province;

the sodium dodecyl sulfate is purchased from Wuxi Asia-Pacific United Chemical Co., Ltd. with a high purity level of "analytically pure".

Each of the sodium carbonate, the sodium hydroxide, the concentrated nitric acid, the concentrated sulfuric acid and the isoamylol is purchased from the Chengdu Kelong Chemical Reagent Factory in Sichuan Province;

the barite is purchased from the Lingshou County Dianshi Mineral Product Processing Factory in Hebei Province, and the model number is D50 barium sulfate.

Preparation Example 1

The Preparation Example serves to illustrate a method of preparing the nanometer plugging agent (surface modified nanometer carbon powder) of the present disclosure.

Taking 0.5 part by weight of nanometer carbon powder and adding it into 100 parts by volume weight of nitric acid having a concentration of 2.4 mol/L, heating the mixture to 40° C. and refluxing for 20 hours, cooling the mixture to room temperature, performing centrifugal separation for 3 times at the rotating speed of 4,000 r/min, washing with deionized water for multiple times until the mixture is neutral in pH value, and then filtering with a microporous filtering membrane to obtain a sample A1;

Taking 0.1 part by weight of the sample A1, adding concentrated nitric acid and concentrated sulfuric acid sequentially with a total volume of 100 mL, wherein the volume ratio of the concentrated sulfuric acid to the concentrated nitric acid is 2.5:1, uniformly mixing and subjecting the mixture to ultrasonic treatment with a power of 1,000 W for 4 hours, performing centrifugal separation for 3 times at a rotating speed of 4,000 r/min, and washing the mixture with deionized water for multiple times until the mixture is neutral in pH value to obtain a sample A2;

Dissolving the sample A2 sufficiently in an aqueous solution of sodium dodecyl sulfate having a concentration of 0.01 wt %, adding 0.05 mL isoamyl alcohol, uniformly mixing and subjecting the mixture to ultrasonic treatment with a power of 1,500 W for 2 hours, washing the mixture with deionized water for multiple times, performing centrifugal separation for 3 times at the rotating speed of 4,000 r/min, then drying in a vacuum drying oven at a temperature of 50° C. for 8 hours, collecting the sample and fully grinding it to obtain the nanometer plugging agent (surface modified carbon powder).

The obtained nanometer plugging agent (i.e., the modified nanometer carbon powder) is black spherical powdery particles with an average particle size of 35.3 nm, it belongs to a rigid material and has desirable dispersion stability in an aqueous solution.

Preparation Example 2

The Preparation Example is to illustrate a method of preparing the nanometer plugging agent of the present disclosure.

Taking 1.5 part by weight of nanometer carbon powder and adding it into 100 parts by volume weight of nitric acid having a concentration of 2.6 mol/L, heating the mixture to 50° C. and refluxing for 24 hours, cooling the mixture to room temperature, performing centrifugal separation for 4 times at the rotating speed of 5,000 r/min, washing with deionized water for multiple times until the mixture is neutral in pH value, and then filtering with a microporous filtering membrane to obtain a sample B1;

Taking 0.3 part by weight of the sample B1, adding concentrated nitric acid and concentrated sulfuric acid sequentially with a total volume of 100 mL, wherein the volume ratio of the concentrated sulfuric acid to the concentrated nitric acid is 3:1, uniformly mixing and subjecting the mixture to ultrasonic treatment with a power of 1,250 W for 5 hours, performing centrifugal separation for 4 times at a rotating speed of 5,000 r/min, and washing the mixture with deionized water for multiple times until the mixture is neutral in pH value to obtain a sample B2;

Dissolving the sample B2 sufficiently in an aqueous solution of sodium dodecyl sulfate having a concentration of 0.03 wt %, adding 0.10 mL isoamyl alcohol, uniformly mixing and subjecting the mixture to ultrasonic treatment with a power of 1,750 W for 3 hours, washing the mixture with deionized water for multiple times, performing centrifugal separation for 4 times at the rotating speed of 5,000 r/min, then drying in a vacuum drying oven at a temperature of 55° C. for 10 hours, collecting the sample and fully grinding it to obtain the nanometer plugging agent modified carbon powder.

The obtained nanometer plugging agent (i.e., the modified nanometer carbon powder) is black spherical powdery particles with an average particle size of 53.4 nm, it belongs to a rigid material and has desirable dispersion stability in an aqueous solution.

Preparation Example 3

The Preparation Example is to illustrate a method of preparing the nanometer plugging agent of the present disclosure.

Taking 2.5 part by weight of nanometer carbon powder and adding it into 100 parts by volume weight of nitric acid having a concentration of 2.8 mol/L, heating the mixture to 60° C. and refluxing for 28 hours, cooling the mixture to room temperature, performing centrifugal separation for 5 times at the rotating speed of 6,000 r/min, washing with deionized water for multiple times until the mixture is neutral in pH value, and then filtering with a microporous filtering membrane to obtain a sample C1;

Taking 0.5 part by weight of the sample C1, adding concentrated nitric acid and concentrated sulfuric acid sequentially with a total volume of 100 mL, wherein the volume ratio of the concentrated sulfuric acid to the concentrated nitric acid is 3.5:1, uniformly mixing and subjecting the mixture to ultrasonic treatment with a power of 1,500 W for 6 hours, performing centrifugal separation for 5 times at a rotating speed of 6,000 r/min, and washing the mixture with deionized water for multiple times until the mixture is neutral in pH value to obtain a sample C2;

Dissolving the sample C2 sufficiently in an aqueous solution of sodium dodecyl sulfate having a concentration of 0.05 wt %, adding 0.15 mL isoamyl alcohol, uniformly mixing and subjecting the mixture to ultrasonic treatment with a power of 2,000 W for 4 hours, washing the mixture with deionized water for multiple times, performing centrifugal separation for 5 times at the rotating speed of 6,000 r/min, then drying in a vacuum drying oven at a temperature of 65° C. for 12 hours, collecting the sample and fully grinding it to obtain the nanometer plugging agent modified carbon powder.

The obtained nanometer plugging agent (i.e., the modified nanometer carbon powder) is black spherical powdery particles with an average particle size of 75.2 nm, it belongs to a rigid material and has desirable dispersion stability in an aqueous solution.

Example 1

The Example illustrates the drilling fluid of the present disclosure and a method for preparing the same.

(1) Weighing 100 parts by weight of water, heating it to a temperature of 50° C., adding 3 parts by weight of bentonite under the stirring state of 500 r/min, stirring for 20 min, then adding 0.15 part by weight of sodium carbonate and stirring for 30 min, sealing and standing for 24 hours, and subjecting the bentonite to pre-hydration treatment.

(2) After the pre-hydration is finished, placing the bentonite slurry in a stirring state of 800 r/min and stirring for 20 min, adding 3 parts by weight of a filtrate reducer lignite resin SPNH and stirring for 10 min, adding 4 parts by weight of a filtrate reducer low-viscosity polyanionic cellulose and stirring for 10 min, adding 2.5 parts by weight of an anti-collapse agent modified asphalt FT342 and stirring for 15 min, adding 4.5 parts by weight of a calcium carbonate powder of 400 mesh as the anti-collapse agent and stirring for 15 min, then adding 4.5 parts by weight of a calcium carbonate powder of 1,250 mesh as the anti-collapse agent and stirring for 15 min, adding 3.5 parts by weight of a nanometer paraffin emulsion with a median particle size D50 of 6.5 μm and stirring for 20 min, adding 2.0 parts by weight of the nanometer plugging agent (surface modified nanometer carbon powder) prepared in the Preparation Example 2 and stirring for 20 min, adding 20 parts by weight of the weighting agent barite and stirring for 20 min, after sufficiently stirring, adding sodium hydroxide in an appropriate amount and adjusting the pH of the drilling fluid to 10, thereby obtain the micro-nanometer plugging anti-collapse drilling fluid.

The density, high-temperature high-pressure (HTHP) filtrate loss and mud cake thickness experimental data of the micro-nanometer plugging anti-collapse drilling fluid are as shown in Table 1, and the experimental data of plugging micropores and apertures are as shown in Table 2.

Example 2

The Example illustrates the drilling fluid of the present disclosure and a method for preparing the same.

(1) Weighing 100 parts by weight of water, heating it to a temperature of 50° C., adding 4 parts by weight of bentonite under the stirring state of 500 r/min, stirring for 20 min, then adding 0.2 part by weight of sodium carbonate and stirring for 30 min, sealing and standing for 24 hours, and subjecting the bentonite to pre-hydration treatment.

(2) After the pre-hydration is finished, placing the bentonite slurry in a stirring state of 800 r/min and stirring for 20 min, adding 4 parts by weight of a filtrate reducer lignite resin SPNH and stirring for 10 min, adding 5 parts by weight of a filtrate reducer low-viscosity polyanionic cellulose and stirring for 10 min, adding 3.0 parts by weight of an anti-collapse agent modified asphalt FT342 and stirring for 15 min, adding 5.0 parts by weight of a calcium carbonate powder of 400 mesh as the anti-collapse agent and stirring for 15 min, then adding 5.0 parts by weight of a calcium carbonate powder of 1,250 mesh as the anti-collapse agent and stirring for 15 min, adding 4.5 parts by weight of a nanometer paraffin emulsion with a median particle size D50 of 6.5 μm and stirring for 20 min, adding 2.5 parts by weight of the nanometer plugging agent (surface modified nanometer carbon powder) prepared in the Preparation Example 2 and stirring for 20 min, adding 16 parts by weight of the weighting agent barite and stirring for 20 min, after sufficiently stirring, adding sodium hydroxide in an appropriate amount and adjusting the pH of the drilling fluid to 10, thereby obtain the micro-nanometer plugging anti-collapse drilling fluid.

The density, high-temperature high-pressure filtrate loss and mud cake thickness experimental data of the micro-nanometer plugging anti-collapse drilling fluid are as shown in Table 1, and the experimental data of plugging micropores and apertures are as shown in Table 2.

Example 3

The Example illustrates the drilling fluid of the present disclosure and a method for preparing the same.

(1) Weighing 100 parts by weight of water, heating it to a temperature of 50° C., adding 5 parts by weight of bentonite under the stirring state of 500 r/min, stirring for 20 min, then adding 0.25 part by weight of sodium carbonate and stirring for 30 min, sealing and standing for 24 hours, and subjecting the bentonite to pre-hydration treatment.

(2) After the pre-hydration is finished, placing the bentonite slurry in a stirring state of 800 r/min and stirring for 20 min, adding 5 parts by weight of a filtrate reducer lignite resin SPNH and stirring for 10 min, adding 6 parts by weight of a filtrate reducer low-viscosity polyanionic cellulose and stirring for 10 min, adding 3.5 parts by weight of an anti-collapse agent modified asphalt FT342 and stirring for 15 min, adding 5.5 parts by weight of a calcium carbonate powder of 400 mesh as the anti-collapse agent and stirring for 15 min, then adding 5.5 parts by weight of a calcium carbonate powder of 1,250 mesh as the anti-collapse agent and stirring for 15 min, adding 5.5 parts by weight of a nanometer paraffin emulsion with a median particle size D50 of 6.5 μm and stirring for 20 min, adding 3.0 parts by weight of the nanometer plugging agent (surface modified nanometer carbon powder) prepared in the Preparation Example 2 and stirring for 20 min, adding 12 parts by weight of the weighting agent barite and stirring for 20 min, after sufficiently stirring, adding sodium hydroxide in an appropriate amount and adjusting the pH of the drilling fluid to 10, thereby obtain the micro-nanometer plugging anti-collapse drilling fluid.

The density, high-temperature high-pressure filtrate loss and mud cake thickness experimental data of the micro-nanometer plugging anti-collapse drilling fluid are as shown in Table 1, and the experimental data of plugging micropores and apertures are as shown in Table 2.

Example 4

The Example illustrates the drilling fluid of the present disclosure and a method for preparing the same.

(1) Weighing 100 parts by weight of water, heating it to a temperature of 45° C., adding 3 parts by weight of bentonite under the stirring state of 450 r/min, stirring for 20 min, then adding 0.15 part by weight of sodium carbonate and stirring for 30 min, sealing and standing for 24 hours, and subjecting the bentonite to pre-hydration treatment.

(2) After the pre-hydration is finished, placing the bentonite slurry in a stirring state of 750 r/min and stirring for 20 min, adding 2.0 parts by weight of a filtrate reducer lignite resin SPNH and stirring for 10 min, adding 3.0 parts by weight of a filtrate reducer low-viscosity polyanionic cellulose and stirring for 10 min, adding 1.5 parts by weight of an anti-collapse agent modified asphalt FT342 and stirring for 15 min, adding 4.0 parts by weight of a calcium carbonate powder of 400 mesh as the anti-collapse agent and stirring for 15 min, then adding 4.0 parts by weight of a calcium carbonate powder of 1,250 mesh as the anti-collapse agent and stirring for 15 min, adding 2.5 parts by weight of a nanometer paraffin emulsion with a median particle size D50 of 6.5 μm and stirring for 20 min, adding 1.5 parts by weight of the nanometer plugging agent (surface modified nanometer carbon powder) prepared in the Preparation Example 2 and stirring for 20 min, adding 24 parts by weight of the weighting agent barite and stirring for 20 min, after sufficiently stirring, adding sodium hydroxide in an appropriate amount and adjusting the pH of the drilling fluid to 10, thereby obtain the micro-nanometer plugging anti-collapse drilling fluid.

The density, high-temperature high-pressure filtrate loss and mud cake thickness experimental data of the micro-nanometer plugging anti-collapse drilling fluid are as shown in Table 1, and the experimental data of plugging micropores and apertures are as shown in Table 2.

Example 5

The Example illustrates the drilling fluid of the present disclosure and a method for preparing the same.

(1) Weighing 100 parts by weight of water, heating it to a temperature of 55° C., adding 5 parts by weight of bentonite under the stirring state of 550 r/min, stirring for 20 min, then adding 0.25 part by weight of sodium carbonate and stirring for 30 min, sealing and standing for 24 hours, and subjecting the bentonite to pre-hydration treatment.

(2) After the pre-hydration is finished, placing the bentonite slurry in a stirring state of 850 r/min and stirring for 20 min, adding 6.0 parts by weight of a filtrate reducer lignite resin SPNH and stirring for 10 min, adding 7.0 parts by weight of a filtrate reducer low-viscosity polyanionic cellulose and stirring for 10 min, adding 4.5 parts by weight of an anti-collapse agent modified asphalt FT342 and stirring for 15 min, adding 6.0 parts by weight of a calcium carbonate powder of 400 mesh as the anti-collapse agent and stirring for 15 min, then adding 6.0 parts by weight of a calcium carbonate powder of 1,250 mesh as the anti-collapse agent and stirring for 15 min, adding 6.5 parts by weight of a nanometer paraffin emulsion with a median particle size D50 of 6.5 μm and stirring for 20 min, adding 3.5 parts by weight of the nanometer plugging agent (surface modified nanometer carbon powder) prepared in the Preparation Example 2 and stirring for 20 min, adding 10 parts by weight of the weighting agent barite and stirring for 20 min, after sufficiently stirring, adding sodium hydroxide in an appropriate amount and adjusting the pH of the drilling fluid to 10, thereby obtain the micro-nanometer plugging anti-collapse drilling fluid.

The density, high-temperature high-pressure filtrate loss and mud cake thickness experimental data of the micro-nanometer plugging anti-collapse drilling fluid are as shown in Table 1, and the experimental data of plugging micropores and apertures are as shown in Table 2.

Example 6

The drilling fluid is prepared in the same method as in Example 1, except for that the nanometer plugging agent in Example 1 (i.e., the nanometer plugging agent prepared in Preparation Example 2) is replaced with the nanometer plugging agent prepared in Preparation Example 1.

The testing results concerning the density, the high-temperature and high-pressure filtrate loss and the mud cake thickness of the drilling fluid are as shown in Table 1, and the testing results of plugging micropores and apertures are as shown in Table 2.

Example 7

The drilling fluid is prepared in the same method as in Example 2, except for that the nanometer plugging agent in Example 2 (i.e., the nanometer plugging agent prepared in Preparation Example 2) is replaced with the nanometer plugging agent prepared in Preparation Example 1.

The testing results concerning the density, the high-temperature and high-pressure filtrate loss and the mud cake thickness of the drilling fluid are as shown in Table 1, and the testing results of plugging micropores and apertures are as shown in Table 2.

Example 8

The drilling fluid is prepared in the same method as in Example 3, except for that the nanometer plugging agent in Example 3 (i.e., the nanometer plugging agent prepared in Preparation Example 2) is replaced with the nanometer plugging agent nanometer carbon powder prepared in Preparation Example 1.

The testing results concerning the density, the high-temperature and high-pressure filtrate loss and the mud cake thickness of the drilling fluid are as shown in Table 1, and the testing results of plugging micropores and apertures are as shown in Table 2.

Example 9

The drilling fluid is prepared in the same method as in Example 4, except for that the nanometer plugging agent in Example 4 (i.e., the nanometer plugging agent prepared in Preparation Example 2) is replaced with the nanometer plugging agent prepared in Preparation Example 1.

The testing results concerning the density, the high-temperature and high-pressure filtrate loss and the mud cake thickness of the drilling fluid are as shown in Table 1, and the testing results of plugging micropores and apertures are as shown in Table 2.

Example 10

The drilling fluid is prepared in the same method as in Example 5, except for that the nanometer plugging agent in Example 5 (i.e., the nanometer plugging agent prepared in Preparation Example 2) is replaced with the nanometer plugging agent prepared in Preparation Example 1.

The testing results concerning the density, the high-temperature and high-pressure filtrate loss and the mud cake thickness of the drilling fluid are as shown in Table 1, and the testing results of plugging micropores and apertures are as shown in Table 2.

Example 11

The drilling fluid is prepared in the same method as in Example 1, except for that the nanometer plugging agent in Example 1 (i.e., the nanometer plugging agent prepared in Preparation Example 2) is replaced with the nanometer plugging agent prepared in Preparation Example 1.

The testing results concerning the density, the high-temperature and high-pressure filtrate loss and the mud cake thickness of the drilling fluid are as shown in Table 1, and the testing results of plugging micropores and apertures are as shown in Table 2.

Example 12

The drilling fluid is prepared in the same method as in Example 2, except for that the nanometer plugging agent in Example 2 (i.e., the nanometer plugging agent prepared in Preparation Example 2) is replaced with the nanometer plugging agent prepared in Preparation Example 3.

The testing results concerning the density, the high-temperature and high-pressure filtrate loss and the mud cake thickness of the drilling fluid are as shown in Table 1, and the testing results of plugging micropores and apertures are as shown in Table 2.

Example 13

The drilling fluid is prepared in the same method as in Example 3, except for that the nanometer plugging agent in Example 3 (i.e., the nanometer plugging agent prepared in Preparation Example 2) is replaced with the nanometer plugging agent prepared in Preparation Example 3.

The testing results concerning the density, the high-temperature and high-pressure filtrate loss and the mud cake thickness of the drilling fluid are as shown in Table 1, and the testing results of plugging micropores and apertures are as shown in Table 2.

Example 14

The drilling fluid is prepared in the same method as in Example 4, except for that the nanometer plugging agent in Example 4 (i.e., the nanometer plugging agent prepared in Preparation Example 2) is replaced with the nanometer plugging agent prepared in Preparation Example 3.

The testing results concerning the density, the high-temperature and high-pressure filtrate loss and the mud cake thickness of the drilling fluid are as shown in Table 1, and the testing results of plugging micropores and apertures are as shown in Table 2.

Example 15

The drilling fluid is prepared in the same method as in Example 5, except for that the nanometer plugging agent in Example 5 (i.e., the nanometer plugging agent prepared in Preparation Example 2) is replaced with the nanometer plugging agent prepared in Preparation Example 3.

The testing results concerning the density, the high-temperature and high-pressure filtrate loss and the mud cake thickness of the drilling fluid are as shown in Table 1, and the testing results of plugging micropores and apertures are as shown in Table 2.

Comparative Example 1

The drilling fluid is prepared in the same method as in Example 2, except for that the amounts of the filtrate reducer lignite resin and the low-viscosity polyanionic cellulose in Example 2 are respectively modified to 0 part by weight, and the amount of the weighting agent barite is modified to 24 parts by weight.

The testing results concerning the density, the high-temperature and high-pressure filtrate loss and the mud cake thickness of the drilling fluid are as shown in Table 1, and the testing results of plugging micropores and apertures are as shown in Table 2.

Comparative Example 2

Drilling fluid was prepared in the same method as in Example 2, except for that the amounts of the anti-collapse agent calcium carbonate powder and the nanometer paraffin emulsion in Example 2 are respectively modified into 0 part by weight, and the amount of the weighting agent barite is modified to 24 parts by weight.

The testing results concerning the density, the high-temperature and high-pressure filtrate loss and the mud cake thickness of the drilling fluid are as shown in Table 1, and the testing results of plugging micropores and apertures are as shown in Table 2.

Comparative Example 3

The drilling fluid is prepared in the same method as in Example 2, except for that the amount of the surface-modified nanometer carbon powder in Example 1 is modified to 0 part by weight, and the amount of the weighting agent barite is modified to 20 parts by weight.

The testing results concerning the density, the high-temperature and high-pressure filtrate loss and the mud cake thickness of the drilling fluid are as shown in Table 1, and the testing results of plugging micropores and apertures are as shown in Table 2.

Comparative Example 4

The drilling fluid is prepared in the same method as in Example 2, except for that the amount of the nanometer plugging agent surface-modified nanometer carbon powder in Example 1 is modified to 20 parts by weight, and the amount of the weighting agent barite is modified to 10 parts by weight.

The testing results concerning the density, the high-temperature and high-pressure filtrate loss and the mud cake thickness of the drilling fluid are as shown in Table 1, and the testing results of plugging micropores and apertures are as shown in Table 2.

Comparative Example 5

The drilling fluid is prepared in the same method as in Example 2, except for that the amounts of the anti-collapse agent modified asphalt FT342, the 400 mesh calcium carbonate powder, the 1,250 mesh calcium carbonate powder and the nanometer paraffin emulsion in the Examples 2 are respectively modified to 0 part by weight, the amount of the nanometer plugging agent surface modified nanometer carbon powder is amended to 0 part by weight, and the amount of the weighting agent barite is modified into 26 parts by weight.

The testing results concerning the density, the high-temperature and high-pressure filtrate loss and the mud cake thickness of the drilling fluid are as shown in Table 1, and the testing results of plugging micropores and apertures are as shown in Table 2.

Comparative Example 6

The drilling fluid is prepared in the same method as in Example 2, except for that the amounts of both the filtrate reducer lignite resin and the low-viscosity polyanionic cellulose in the Example 2 are modified into 0 part by weight, the amounts of the anti-collapse agent modified asphalt FT342, the 400 mesh calcium carbonate powder, the 1,250 mesh calcium carbonate powder and the nanometer paraffin emulsion are respectively modified into 0 part by weight, the amount of the nanometer plugging agent surface modified nanometer carbon powder is amended to 0 part by weight, and the amount of the weighting agent barite is modified to 32 parts by weight.

The testing results concerning the density, the high-temperature and high-pressure filtrate loss and the mud cake thickness of the drilling fluid are as shown in Table 1, and the testing results of plugging micropores and apertures are as shown in Table 2.

Test Example 1

An appropriate amount of the drilling fluids prepared in Examples 1-15 and Comparative Examples 1-6 are taken respectively, and the densities of the drilling fluids are respectively measured by using a densitometer for drilling fluids; the high-temperature and high-pressure filtrate loss of the drilling fluids under the pressure difference of 3.5 MPa and the time of 30 min are respectively tested by using a high-temperature and high-pressure filtrate loss instrument, and the thickness of the corresponding mud cakes is measured by using a steel ruler. The experimental test results concerning the density, high temperature and high pressure filtrate loss, and the thickness of mud cakes are shown in Table 1.

TABLE 1

| Numbers | Density (g/cm$^3$) | HTHP filtrate loss (ml) | Thickness of mud cakes (mm) |
| --- | --- | --- | --- |
| Example 1 | 1.24 | 8.8 | 2.4 |
| Example 2 | 1.21 | 8.0 | 2.2 |
| Example 3 | 1.18 | 8.5 | 2.4 |
| Example 4 | 1.27 | 10.3 | 3.2 |
| Example 5 | 1.15 | 9.8 | 3.0 |
| Example 6 | 1.24 | 9.2 | 2.8 |
| Example 7 | 1.21 | 9.0 | 2.6 |
| Example 8 | 1.18 | 9.6 | 2.8 |
| Example 9 | 1.27 | 11.0 | 3.6 |
| Example 10 | 1.15 | 10.5 | 3.4 |
| Example 11 | 1.24 | 10.0 | 3.0 |
| Example 12 | 1.21 | 9.8 | 2.8 |
| Example 13 | 1.18 | 10.9 | 3.5 |
| Example 14 | 1.27 | 11.8 | 4.0 |
| Example 15 | 1.15 | 11.0 | 3.7 |
| Comparative Example 1 | 1.28 | 27.8 | 12.4 |
| Comparative Example 2 | 1.28 | 17.8 | 7.2 |
| Comparative Example 3 | 1.24 | 16.5 | 6.2 |
| Comparative Example 4 | 1.30 | 18.4 | 8.1 |
| Comparative Example 5 | 1.25 | 22.6 | 10.7 |
| Comparative Example 6 | 1.25 | 22.6 | 10.7 |

As can be seen from the experimental test results in Table 1:

(1) By controlling the dosage of the weighting agent barite, the densities of the drilling fluids respectively prepared in Examples 1-15 and Comparative Examples 1-6 are basically consistent with each other to be within the range of 1.18-1.30 g/cm$^3$, such that the performance differences of the drilling fluids caused by inconsistent densities of the drilling fluid densities are avoided to the maximum extent, and the experimental test results are scientific and reliable.

(2) The drilling fluids prepared in the Examples 1-15 have the high-temperature high-pressure filtrate loss within a range of 8.0-11.8 mL, the mud cakes have a thickness within a range of 2.2-4.0 mm, the filtrate loss and wall building properties are excellent, it indicates that during a process of drilling a fragile stratum which is made of carbonate rock, the particle size of the drilling fluid is sufficiently and uniformly distributed in the micro-nanometer level, the compact, tough and extremely thin mud cakes with the permeability approaching zero are formed under the circulating percolation action of a shaft, a large amount of drilling fluid filtrate is prevented from entering the borehole wall and aperture which may cause expansion and extension of the micro-crack stratification, the borehole wall is prevented from collapsing and falling blocks to cause sticking of the drilling tool in the drilling process, thereby performing the plugging and anti-collapse efficiently.

(3) Compared with the performances of the drilling fluids prepared in Examples 1-15, the high-temperature and high-pressure filtrate loss of the drilling fluids prepared in Comparative Examples 1-3 exceeds 16.5 ml respectively, and its maximum reaches 27.8 ml; the mud cakes have the thickness exceeding 6.2 mm, and its maximum reaches 12.4 mm, it indicates that in terms of the influence on the filtrate loss and wall building properties of the drilling fluids, the filtrate reducer has larger influence than the anti-collapse agent, which has larger influence than the nanometer plugging agent; it also indicates that if a micro-nanometer plugging anti-collapse drilling fluid system with good filtration performance is to be constructed, none of the filter reducer, the anti-collapse agent and the nanometer plugging agent serving as the treating agents is dispensable, it further demonstrates that the drilling fluids prepared with proper component within suitable content ranges have desirable properties.

(4) Compared with the properties of the drilling fluids prepared in Examples 1-15, the high-temperature high-pressure filtrate loss of the drilling fluid prepared in Comparative Example 4 is 18.4 mL, the thickness of a mud cake is 8.1 mm, it demonstrates that the high-temperature high-pressure filtrate loss is increased by 6.6 mL and the thickness of the mud cake is increased by 4.1 mm as compared with the maximum value in Examples 1-15, which indicates that an excessively high dosage of the nanometer plugging agent imposes a certain negative influence on the filtrate loss and wall building properties of the micro-nanometer plugging anti-collapse drilling fluid.

(5) Compared with the performances of the drilling fluids prepared in Examples 1-15, the high-temperature and high-pressure filtrate loss of the drilling fluids prepared in Comparative Examples 5-6 exceeds 22.6 ml, the maximum is 24.6 ml; the mud cakes have a thickness exceeding 10.7 mm, and the maximum reaches 11.5 mm, it demonstrates that in terms of the influence of the filtrate loss and wall building properties of the drilling fluids, the bentonite, the filtrate reducer, the anti-collapse agent and the nanometer plugging agent may form a reasonable particle size grading, the rigid material and the elastic material are matched to perform multi-element synergistic plugging under the high-temperature and high-pressure environment at the shaft bottom, so as to generate the mud cakes with the permeability approaching zero, and effectively block the invasion of filtrate to the development of apertures in a broken stratum of the well wall, it also indicates that the drilling fluids formulated with appropriate composition within the suitable content ranges have excellent filtrate loss and wall building properties.

To sum up, the present disclosure provides a micro-nanometer plugging anti-collapse drilling fluid for drilling the carbonate rock broken strata in the fractured zone of the deep well and the ultra-deep well, the drilling fluid is capable of sufficiently performing multi-component synergistic plugging under the action of high-temperature inside the well through the rigid material and the elastic material according to reasonable particle size grading, in combination with the optimal dosages of the rigid material and the elastic material, such that the particle size of the drilling fluid is sufficiently and uniformly distributed in the micro-nanometer level, the compact, tough and extremely thin mud cakes with the permeability approaching zero may be formed under the circulating percolation action of the drilling fluid at the shaft, a large amount of drilling fluid filtrate is prevented from entering the borehole wall and aperture which may cause expansion and extension of the micro-crack stratification, the borehole wall is prevented from collapsing and falling blocks to cause sticking of the drilling tool in the drilling process, thereby performing the plugging and anti-collapse efficiently.

Test Example 2

A proper amount of the drilling fluids prepared in Examples 1-15 and the Comparative Examples 1-7 are respectively taken and standing ready for use, a visible sand bed filtrate loss meter is used for taking 250 cm$^3$ of 300 mesh quartz sand and 100 cm$^3$ of 800 mesh quartz sand, mixing the quartz sands and stirring uniformly, slowly adding the mixture into a transparent cylindrical drilling fluid cup to simulate a carbonate heterogeneous aperture type fragile stratum, then slowly adding 500 cm$^3$ of the prepared drilling fluid which is standing ready for use, closing a cup cover, switching on a nitrogen gas source to adjust the air pressure to 0.69 MPa, opening a vent valve after confirming an errorless state, and transmitting the pressure to the drilling fluid cup, thereby simulating the percolation effect of the drilling fluid under the action of high pressure of the stratum during the circulation process of a shaft, simultaneously observing the percolation process of the drilling fluid in the transparent cup body and recording the invasion depth of the drilling fluid at the time lapses of 7.5 min and 30 min respectively. The experimental test results are as shown in Table 2.

TABLE 2

| Numbers | The invasion depth/cm at the time of 7.5 min | The invasion depth/cm at the time of 30 min |
| --- | --- | --- |
| Example 1 | 3.2 | 4.8 |
| Example 2 | 2.9 | 4.5 |
| Example 3 | 3.0 | 4.5 |
| Example 4 | 3.8 | 5.4 |
| Example 5 | 3.5 | 5.3 |
| Example 6 | 3.2 | 4.7 |
| Example 7 | 3.2 | 4.8 |
| Example 8 | 3.6 | 5.3 |
| Example 9 | 4.3 | 6.0 |
| Example 10 | 4.2 | 5.8 |
| Example 11 | 3.9 | 5.4 |
| Example 12 | 3.4 | 5.0 |
| Example 13 | 4.5 | 6.2 |
| Example 14 | 5.1 | 6.8 |
| Example 15 | 4.5 | 6.2 |
| Comparative Example 1 | 6.8 | 8.3 |
| Comparative Example 2 | 8.2 | 9.6 |
| Comparative Example 3 | 7.9 | 9.4 |
| Comparative Example 4 | 8.4 | 10.2 |
| Comparative Example 5 | 7.9 | 8.9 |
| Comparative Example 6 | 8.8 | 10.4 |

It is illustrated by the data in Table 2:

(1) The invasion depth of the drilling fluids prepared in Examples 1-3 in a simulated stratum at the time of 7.5 min is within a range of 2.9-3.2 cm, and the invasion depth of the drilling fluids at the time of 30 min is within a range of 4.5-4.8 cm; the invasion depth of the drilling fluids prepared in Examples 4-15 in a simulated stratum at the time of 7.5 min is within a range of 3.2-5.1 cm, and the invasion depth of the drilling fluids at the time of 30 min is within a range of 4.7-6.8 cm; it demonstrates that in the preferable dosage range of the treating agents, the solid-phase particles of the drilling fluid can bridge the holes for supporting the plugging at the ports of micropore and aperture around the well at the moment that a drill bit opens the stratum, thereby enhancing the collapse pressure of a broken stratum, preventing the leakage and spalling erosion between the weakly cemented stratifications caused by the agitation of a liquid column pressure and the collision of a drilling tool, and producing the desirable plugging performance; in addition, it indicates that the high-efficiency plugging anti-collapse drilling fluids prepared with the components and contents thereof within the optimal limited ranges have the optimal plugging and anti-collapse properties.

(2) Compared with the properties of the drilling fluids prepared in Examples 1-15, the drilling fluids prepared in Comparative Examples 1-3 have the invasion depths exceeding 6.8 cm respectively at the time of 7.5 min, the maximum invasion depths is 8.2 cm; the invasion depths exceeds 8.3 cm respectively at the time of 30 min, the maximum invasion depth reaches 9.6 cm, it demonstrates that in terms of the influence on the plugging and anti-collapse properties of the drilling fluids, the anti-collapse agent has larger influence than the nanometer plugging agent, which has larger influence than the filtrate reducer; the minimum invasion depth at the time of 7.5 min in Comparative Examples 1-3 is increased by 3.6 cm compared with the maximum invasion depth at the time of 7.5 min in Examples 1-15, and the minimum invasion depth at the time of 30 min in Comparative Examples 1-3 is increased by 1.5 cm compared with the maximum invasion depth at the time of 30 min in Examples 1-15, it indicates that in regard to the micro-nanometer plugging anti-collapse drilling fluids, the solid phase particles (the filtrate reducer, the anti-collapse agent and the nanometer plugging agent) in the drilling fluids have obvious effects on bridging the holes for supporting the plugging at the ports of micropore and aperture around the well and increasing the collapse pressure of broken stratum; in addition, it indicates that the drilling fluids prepared with the components and contents thereof within the optimal limited ranges have the desirable plugging and anti-collapse properties.

(3) Compared with the properties of the drilling fluids prepared in Examples 1-15, the drilling fluid prepared in Comparative Example 4 has an invasion depth of 8.4 cm at the time of 7.5 min and an invasion depth of 10.2 cm at the time of 30 min; the invasion depth of Comparative Example 4 at the time of 7.5 min is increased 3.3 cm compared with the maximum invasion depth of Examples 1-15 at the time of 7.5 min, and the invasion depth of Comparative Example 4 at the time of 30 min is increased 3.4 cm compared with the maximum invasion depth of Examples 1-15 at the time of 30 min; it indicates that in terms of the influence on the plugging and anti-collapse properties of the drilling fluids, an excessive amount of the nanometer plugging agent will cause an uneven dispersion, it is adverse to formation of the uniform and appropriate particle size distribution, and has negative influence on filling and supporting among micron-sized solid phase particles; moreover, it illustrates that the drilling fluids prepared with the components and contents thereof within the appropriate limited ranges have the desirable plugging and anti-collapse properties.

(4) Compared with the performances of the drilling fluids prepared in Examples 1-15, the drilling fluids prepared in Comparative Examples 5-6 have the invasion depths exceeding 7.9 cm at the time of 7.5 min, the maximum invasion depth at the time of 7.5 min is 8.8 cm; the drilling fluids prepared in Comparative Examples 5-6 have the invasion depths exceeding 8.9 cm at the time of 30 min, the maximum invasion depth reaches 10.4 cm at the time of 30 min, it indicates that in terms of the influence on the plugging and anti-collapse properties of the drilling fluids, the solid phase particles of the bentonite, the filtrate reducer, the anti-collapse agent and the nanometer plugging agent may form the reasonable particle size grading, the rigid particles and the elastic particles are in synergy to bridging the holes and sufficiently fill so as to perform shielding and temporary plugging, thereby effectively reducing the invasion depths of the drilling fluids or the filtrates, enhancing the bonding force between developed aperture stratifications, restraining hydraulic wedge; moreover, it indicates that the drilling fluids prepared with the components and contents thereof within the appropriate limited ranges have the desirable plugging and anti-collapse properties.

To sum up, the present disclosure provides a micro-nanometer plugging anti-collapse drilling fluid adaptive for drilling the carbonate rock broken strata in the fractured zone of the deep well and the ultra-deep well, the drilling fluid comprises rigid particles and elastic particles for bridging and filling holes according to reasonable particle size grading, such that the solid-phase and liquid-phase particles of the drilling fluid can bridge the holes for supporting the plugging at the development ports of micropore and aperture stratification around the well at the moment that a drill bit opens the stratum, thereby enhancing the collapse pressure of a broken stratum, preventing the leakage and spalling erosion between weakly cemented stratifications caused by the agitation of a liquid column pressure and the collision of a drilling tool, preventing a large amount of drilling fluid filtrate from entering the borehole wall and aperture which may cause expansion and extension of the micro-crack stratification, and producing the desirable plugging performance; in addition, the borehole wall is effectively prevented from collapsing and falling blocks to cause sticking of the drilling tool in the drilling process, thereby performing the plugging and anti-collapse efficiently.

The above content describes in detail the preferred embodiments of the present, but the present is not limited thereto. A variety of simple modifications can be made to the technical solutions of the present within the scope of the technical concept of the present, including a combination of individual technical features in any other suitable manner, such simple modifications and combinations thereof shall also be regarded as the content disclosed by the present present, each of them falls into the protection scope of the present invention.

The invention claimed is:

1. A micro-nanometer plugging anti-collapse drilling fluid, wherein the drilling fluid comprises water, bentonite, a filtrate reducer, an anti-collapse agent, a nanometer plugging agent and a weighting agent;
   the anti-collapse agent is one or more selected from the group consisting of modified asphalt, calcium carbonate powder and nanometer paraffin emulsion; the calcium carbonate powder comprises 400 mesh calcium carbonate powder and 1,250 mesh calcium carbonate powder; the nanometer paraffin emulsion has a median particle size D50 of 6.5 μm;
   the nanometer plugging agent is surface modified nanometer carbon powder, and the nanometer plugging agent has an average particle size of 53.4-85 nm;
   wherein the bentonite is contained in an amount of 3-5 parts by weight, the filtrate reducer is contained in an amount of 7-11 parts by weight, the anti-collapse agent is contained in an amount of 15-20 parts by weight, the nanometer plugging agent is contained in an amount of 2-3 parts by weight, and the weighting agent is contained in an amount of 10-32 parts by weight, based on 100 parts by weight of water;
   the nanometer plugging agent obtained by a process comprising:
   (1) subjecting the nanometer carbon powder and nitric acid to a heating reflux reaction, and then carrying out cooling, centrifugal separation, washing and filtering treatment to obtain a sample S1;
   (2) mixing the sample S1 with concentrated nitric acid and concentrated sulfuric acid, implementing a first ultrasonic treatment, and subsequently performing centrifugal separation and washing treatment to obtain a sample S2;
   (3) dissolving the sample S2 in a dispersing agent in the presence of a defoamer and implementing a second ultrasonic treatment, water washing, centrifugal separation and drying treatment to obtain a sample S3;
   (4) grinding the sample S3 to obtain the nanometer plugging agent.

2. The drilling fluid of claim 1, wherein the weight ratio of the contents of the 400 mesh calcium carbonate powder and the 1,250 mesh calcium carbonate powder is 1:(1-3).

3. The drilling fluid of claim 1, wherein the filtrate reducer is a lignite resin and/or a low viscosity polyanionic cellulose.

4. The drilling fluid of claim 1, wherein the weighting agent is barite, and the weighting agent has an average particle size of 45-74 μm.

5. The drilling fluid of claim 3, wherein the lignite resin is contained in an amount of 1-10 parts by weight, and the low-viscosity polyanionic cellulose is contained in an amount of 1-10 parts by weight, based on 100 parts by weight of water.

6. The drilling fluid of claim 1, wherein the drilling fluid further comprises sodium carbonate, and the sodium carbonate is contained in an amount of 0.05-0.5 parts by weight, based on 100 parts by weight of water.

7. The drilling fluid of claim 1, wherein the drilling fluid has a pH of 9-10.

8. The drilling fluid of claim 1, wherein in the step (1), the concentration of nitric acid is 2.4-2.8 mol/L; and the dosage of the nanometer carbon powder is 0.5-2.5 g relative to 100 mL of nitric acid.

9. The drilling fluid of claim 1, wherein in the step (1), the conditions of the heating reflux reaction comprise: the heating temperature is 40-60° C., and the reflux time is 20-28 hours.

10. The drilling fluid of claim 1, wherein in the step (2), the volume ratio of concentrated sulfuric acid to concentrated nitric acid is (2.5-3.5):1.

11. The drilling fluid of claim 1, wherein in the step (2), the sample S1 is used in an amount of 0.1-0.5 grams relative to the total volume 100 mL of concentrated nitric acid and concentrated sulfuric acid.

12. The drilling fluid of claim 1, wherein in the step (2), the time period of the first ultrasonic treatment is within a range of 4-6 hours, and the power is 1,000-1,500 W.

13. The drilling fluid of claim 1, wherein in the step (3), the defoamer is isoamyl alcohol, and the dispersant is an aqueous solution containing sodium dodecyl sulfate;
   the concentration of the dispersant is within a range of 0.01-0.05 wt %;
   the amount of isoamyl alcohol is 0.05-3 mL and the amount of sample S2 is 0.05-0.4 g relative to 100 mL of the dispersant.

14. The drilling fluid of claim 1, wherein in the step (3), the time period of the second ultrasonic wave is 1-3 hours, and the power is 1500-2,000 W;
   wherein the drying temperature is 50-65° C., and the drying time is 8-12 hours.

15. The drilling fluid of claim 1, wherein the rotating speed of the centrifugal separation is within a range of 4,000-6,000 r/min.

16. A method for preparing the drilling fluid of claim 1, the method including:
   (a) subjecting bentonite to a pre-hydration treatment;
   (b) mixing the hydrated bentonite slurry obtained in the step (a) with a filtrate reducer, an anti-collapse agent, a nanometer plugging agent and a weighting agent sequentially under the stirring condition.

17. A method of drilling carbonate rock broken strata in a fractured zone of a deep well or an ultra-deep well with the drilling fluid of claim 1, the method comprising introducing the drilling fluid of claim 1 into a well bore, and drilling the carbonate rock broken strata in the presence of the drilling fluid.

* * * * *